2,823,221

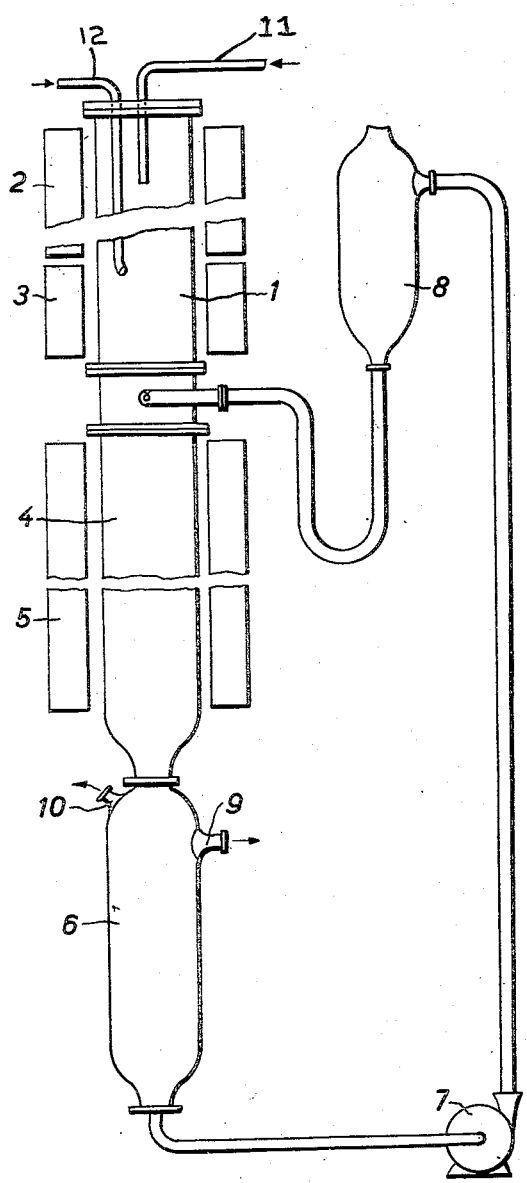

PRODUCTION OF AROMATIC MONOISO-
CYANATES IN THE GASEOUS PHASE

Johannes Pfirschke, Leverkusen-Bayerwerk, Wilhelm Altner, Opladen, and Hans Roos, Leverkusen-Bayerwerk, Germany, assignors to Farbenfabriken Bayer Aktiengesellschaft, Leverkusen, Germany, a corporation of Germany Application November 10, 1953, Serial No. 391,352

Claims priority, application Germany November 11, 1952

3 Claims. (Cl. 260—453)

This invention relates to the production of aromatic monoisocyanates. More particularly the present invention is concerned with an improvement in the production of aromatic monoisocyanates in the gaseous phase.

It is well known that aromatic monoisocyanates can be obtained in the liquid phase by reacting the hydrochlorides of the corresponding amines with an excess of phosgene in a suitable medium at an elevated temperature (100–130° C.). The isocyanates can also be prepared from the free amines without a substantial formation of urea if a solution of the amine in an inert solvent is added to a cool solution of phosgene in an inert solvent. In this reaction, equimolecular amounts of the corresponding carbamic acid chloride and of the amine hydrochloride are formed. By heating and passing phosgene through the solution, both the carbamic acid chloride and the amine hydrochloride are converted to the isocyanate.

It is also known that aromatic monoisocyanates can be produced in the gaseous phase by reacting the vapor of an aromatic amine with phosgene, if desired, after dilution with and entrained in nitrogen, or an inert solvent vapor. This reaction may be effected in the presence or absence of catalysts, at temperatures above 250° C. followed by cooling of the reaction gases. The process seems to be particularly suitable for the commercial production of isocyanates, since it can be operated continuously and with the use of only a small excess of phosgene. Thus, no accumulation of this highly poisonous gas occurs and a special unit for the recovery of the same is not required.

However, considerable difficulties were encountered when attempts were made to carry out this process on a large scale. High melting by-products, such as diphenylurea (melting point: 230° C.), which is formed in an amount of 1–2% in the production of phenylisocyanate, deposited on the walls of the cooling system, thereby forming encrustments and plugging the tubes.

One object of the present invention is to provide an improved process for the production of aromatic monoisocyanates in the gaseous phase without the above-mentioned difficulties. A further object is to provide a process for producing aromatic monoisocyanates, which is suitable for large-scale operation. These, and still further objects, will become apparent from the following description, read in conjunction with the drawing, which shows a diagrammatic representation of an embodiment of an apparatus for effecting the process in accordance with the invention.

It has now been found that aromatic monoisocyanates can be most conveniently produced in a gaseous phase process which is suitable for large-scale operation when the hot reaction gases obtained by reacting the vapor of an aromatic amine with phosgene are contacted with a liquid cooling agent, thereby condensing the hot reaction gases without the formation of encrustments on the walls of the apparatus.

In principle, any inert liquid can be used as a cooling agent in the process of the invention. In a preferred embodiment of the invention the reaction product itself in the form of the carbamic acid chloride is used as a liquid cooling agent.

The temperature of the liquid cooling agent must be sufficiently low to condense the hot reaction gases and will depend on the condensation temperature of the reaction products, the relative quantities of cooling agent to reaction gases, the specific heat of the liquid cooling agents and reaction products, and the latent heat of condensation of the reaction gases (i. e., heat of vaporization of the liquid reaction product). Preferably the liquid cooling agent should be at as low a temperature as is possible, the lowest operable temperature limit in general being determined by the solidification point of the liquid cooling agent.

It is generally preferred to contact the hot reaction gases with the liquid cooling agent at atmospheric pressure, but elevated or reduced pressure may be employed if desired.

A suitable apparatus for contacting the hot reaction gases with the liquid cooling agent is, for example, a column filled with Raschig rings or another packing material.

The following examples serve to illustrate the invention without in any way limiting it.

Example 1

Reaction tube 1 (see the drawing), made of Jena glass, has a length of 2.5 meters and an inside diameter of 100 mm. It is heated by electric ovens 2 and 3, of which oven 2 surrounds ¾ and oven 3 surrounds ¼ of its length. A feed conduit 11 of 0.5 meter length is axially positioned in the reaction tube. Through this conduit 11 a mixture of 2.5 kg. per hour of aniline vapor and 350 liters per hour of carbon dioxide are passed into the reaction tube. Through another feed conduit 12 attached to the side of the reaction tube and having a length of about 1.8 meters, 4 kilograms per hour of phosgene, preheated to about 120° C., are passed in. The upper part of the reaction tube 1 is maintained at a temperature of about 250° C. by oven 2, whereas its bottom quarter, in which the reaction takes place, is maintained at about 275° C. by oven 3.

The reaction gases enter cooler 4, which is positioned immediately below the tube 1 and which is packed with Raschig rings or other suitable filling bodies. There the gases are cooled and condensed to about 65–70° C. by the liquid cooling agent flowing through the cooler. Thus, about 90% of the phenylisocyanate formed in the reaction are obtained in the form of phenyl-carbamic acid chloride, which is formed from phenyl-isocyanate and hydrogen chloride at temperatures below 110° C. Since phenyl carbamic acid chloride solidifies at 52° C., the circulating liquid cooling agent must be held at a temperature of about 60–65° C., which is effected with the aid of electric oven 5. The liquid cooling agent then flows into intermediate vessel 6, from which it is pumped by pump 7 into the upper vessel 8, from which it flows down to the inlet of cooler 4.

When starting operation of the plant, chlorobenzene is used as a liquid cooling agent. In the course of several hours it is completely replaced by phenyl carbamic acid chloride formed in the reaction. For the purpose of keeping constant the volume of the circulating liquid, intermediate vessel 6 has an overflow pipe 9 through which the phenyl carbamic acid chloride not needed for circulation flows into a storage vessel. The exit gases cooled to 65–70° C. leave the plant via connection piece 10 and are passed into a neutralization unit, if desired, after having been washed with chlorobenzene to thereby recover the least traces of phenyl carbamic acid chloride.

The phenyl carbamic acid chloride is split into hydrogen chloride and phenyl isocyanate by heating to about 110° C. under a slight vacuum in a distillation apparatus. After the splitting is complete, the phenyl isocyanate thus obtained is distilled off under the vacuum (10–15 mm. Hg) of an efficient water jet pump. There remains in the still a small amount of a tarry residue. The yield of phenylisocyanate amounts to 90% if the exit gas is washed with chlorobenzene. The chlorobenzene used for the washing step is worked up by distillation.

*Example 2*

Reaction tube 1 (see the drawing), made of Jena glass, has a length of 2.5 meters and an inside diameter of 100 mm. It is heated by electric ovens 2 and 3, of which 2 surrounds ¾ and oven 3 surrounds ¼ of its length. A feed conduit 11 of 0.5 meter length is axially positioned in the reaction tube. Through this conduit 11 a mixture of 2.5 kg. per hour of o-toluidine vapor and 350 liters per hour of carbon dioxide are passed into the reaction tube. Through another feed conduit 12 attached to the side of the reaction tube and having a length of about 1.8 meters, 4 kilograms per hour of phosgene, preheated to about 120° C., are passed in. The upper part of the reaction tube 1 is maintained at a temperature of about 250° C. by oven 2, whereas its bottom quarter, in which the reaction takes place, is maintained at about 275° C. by oven 3.

The reaction gases enter cooler 4, which is positioned immediately below the tube 1 and which is packed with Raschig rings or other suitable filling bodies. There the gases are cooled and condensed to about 40–45° C. by the liquid cooling agent flowing through the cooler. Thus, about 90% of the tolylisocyanate formed in the reaction are obtained in the form of tolyl carbamic acid chloride, which is formed from tolyl-isocyanate and hydrogen chloride at temperatures below 75° C. Since tolyl carbamic acid chloride solidifies at 36° C., the circulating liquid cooling agent must be held at a temperature of about 40–45° C., which is effected with the aid of electric oven 5. The liquid cooling agent then flows into intermediate vessel 6, from which it is pumped by pump 7 into the upper vessel 8, from which it flows down to the inlet of cooler 4.

When starting operation of the plant, chlorobenzene is used as a liquid cooling agent. In the course of several hours it is completely replaced by tolyl carbamic acid chloride formed in the reaction. For the purpose of keeping constant the volume of the circulating liquid, intermediate vessel 6 has an overflow pipe 9 through which the tolyl carbamic acid chloride not needed for circulation flows into a storage vessel. The exit gases cooled to 45–50° C. leave the plant via connection piece 10 and are passed into a neutralization unit, if desired, after having been washed with chlorobenzene to thereby recover the last traces of tolyl carbamic acid chloride.

The tolyl carbamic acid chloride is split into hydrogen chloride and tolyl isocyanate by heating to about 70–80° C. under a slight vacuum in a distillation apparatus. After the splitting is complete, the tolyl isocyanate thus obtained is distilled off under the vacuum (10–15 mm. Hg) of an efficient water jet pump. There remains in the still a small amount of a tarry residue. The yield of tolylisocyanate amounts to 90% if the exit gas is washed with chlorobenzene. The chlorobenzene used for the washing step is worked up by distillation.

The present invention makes it possible to manufacture aromatic monoisocyanates from aryl amines and phosgene with a minimum expenditure of chemicals.

We claim:

1. In the process for the production of aromatic monoisocyanates by contacting an aromatic amine with phosgene in the gaseous phase at an elevated temperature and cooling the hot isocyanate and hydrogen chloride containing reaction gas produced to form the corresponding carbamic acid chloride capable of being decomposed into an aromatic isocyanate and hydrogen chloride, the improvement which comprises initially effecting said cooling by directly contacting the hot reaction gas with an inert liquid cooling agent at a temperature sufficiently low to condense the hot reaction gas and above the solidification point of said carbamic acid chloride, replacing said inert liquid cooling agent with liquid carbamic acid chloride formed in the reaction and continuing said cooling by directly contacting any hot reaction gas with said liquid carbamic acid chloride.

2. Process for producing aromatic monoisocyanates which comprises establishing a vertically extending reaction zone and a vertically extending cooling zone filled with packing material directly therebelow, contacting an aromatic amine with phosgene in the gaseous phase at an elevated temperature in said reaction zone to thereby form hot reaction gas containing an aromatic monoisocyanate and hydrogen chloride, passing said hot reaction gas downwardly into and through said cooling zone, passing liquid carbamic acid chloride corresponding to said aromatic monoisocyanate as a cooling agent into the upper portion of said cooling zone in direct contact with said hot reaction gas, recovering the resulting liquid reaction product after passage through said cooling zone, recycling a portion of the liquid reaction product into the upper portion of said cooling zone for passage therethrough as a cooling agent, and decomposing the portion not recycled into an aromatic isocyanate.

3. Process according to claim 2 which includes at the beginning of the process passing an inert liquid cooling agent into the upper portion of said cooling zone in contact with said hot reaction gas at a temperature below the condensation point of said carbamic acid chloride and above the solidification point thereof, and which includes replacing said inert liquid cooling agent with the liquid carbamic acid chloride formed during the process.

References Cited in the file of this patent
UNITED STATES PATENTS

| | | |
|---|---|---|
| 2,198,142 | Wade | Apr. 23, 1940 |
| 2,333,193 | Persson et al. | Nov. 2, 1943 |
| 2,386,390 | Fernelius et al. | Oct. 9, 1945 |
| 2,480,088 | Slocombe et al. | Aug. 23, 1949 |
| 2,480,089 | Slocombe et al. | Aug. 23, 1949 |
| 2,715,948 | Lewis | Aug. 23, 1955 |